Dec. 27, 1966 R. H. DOWNIE ET AL 3,294,889

METHOD OF MAKING A PRINTING CYLINDER

Filed Feb. 26, 1963

INVENTORS
ROBERT H. DOWNIE
ROBERT V. HERSHEY
HENRY W. HOFTIEZER
BY George E. Verhage
ATTORNEY United States Patent Office 3,294,889

Patented Dec. 27, 1966

3,294,889

METHOD OF MAKING A PRINTING CYLINDER

Robert H. Downie and Robert V. Hershey, Neenah, and Henry W. Hoftiezer, Schofield, Wis., assignors to American Can Company, New York, N.Y., a corporation of New Jersey Filed Feb. 26, 1963, Ser. No. 261,567
3 Claims. (Cl. 264—255)

This invention relates to the manufacture of rotogravure printing cylinders and, more particularly, to a method for producing a rotogravure printing cylinder having as the printing surface thereof a thin layer of photosensitized polymeric material and to the printing cylinder produced by such method.

The rotogravure printing process is extensively utilized, particularly since it offers outstanding advantages in accuracy of reproduction of tonal qualities, rapid and complete drying of the printed material with no necessity for use of off-set preventing dusts or coatings, rapid press make-ready with excellent registration of a plurality of colors and very high press speeds. The rotogravure printing cylinders are, however, expensive to manufacture and require a very complex and time-consuming process when it is necessary to change the design to be printed by the cylinders. For this reason, rotogravure printing is generally restricted to "long run" situations in which the number of identical impressions to be made is very high, it being uneconomical to prepare standard rotogravure cylinders for short or medium run printing situations. Shorter runs, in which relatively small numbers of printed impressions are made, must be carried out by other printing processes which lack some of the advantages inherent in rotogravure printing. The need, then, for a less expensive rotogravure printing cylinder, which will enable the economical extension of the inherent benefits of rotogravure printing to short run situations, is obvious. An inexpensive rotogravure cylinder satisfactory for this use has hitherto not been available.

The solution to this problem is achieved in the present invention by the formation, through a unique series of casting steps, of a base cylinder cast molded about a shaft and having a very thin surface coating of a photosensitive solid polymeric material. This coating, upon insolubilization by actinic light passing through an image-bearing process transparency, forms the printing surface containing the intaglio ink-retaining cells typical of the rotogravure printing process.

To be satisfactory for use in rotogravure work, the printing surface of the unetched, blank cylinder must be flawlessly smooth and must not vary from that of a true cylinder by more than about 0.0005 inch at any point. This requirement precludes the preparation of the cylinder by casting in a conventional, segmented mold because the mold seams cause imperfections in the cast cylinder surface.

The process of this invention makes possible the preparation of a cast cylinder of a thermosetting resin composition having as a surface layer a thin coating of a photosensitized solid polymeric material. The unique preparation procedure hereinafter described results in photosensitive polymer-surfaced rotogravure cylinders which are perfectly cylindrical within diameter limits of about 0.0002 to 0.0003 inch. The cylinders may be exposed to light passing through an image bearing process transparency, whereby the areas exposed to light become hardened by cross-linking of the polymer and the image areas may then be developed by washing the exposed cylinder in selected solvents which dissolve the polymer in those areas not exposed to light to yeild a printing surface of a polymeric material comparable in its operative characteristics to the usual rotogravure cylinder.

In the generalized procedure for the preparation of the rotogravure cylinder of this invention, a thin coating of a photosensitive polymeric material is first cast on the microhoned interior surface of a seamless cylindrical steel mold. A thin backing layer of an epoxy-type resin coating is then applied over the photosensitive layer in the mold and allowed to harden while under the influence of a substantial centrifugal force. A bearing shaft is then centered along the longitudinal axis of the cylindrical mold and the residual interior space within the cylinder filled with a filler composition of epoxy-type resin. After hardening of the resin, the completed cylinder blank bearing the photosensitized coating on its outer surface is removed from the mold by chilling the assembly sufficiently to allow the cylinder to slip endwise from the seamless cylindrical steel mold.

The advantages of the invention will be readily apparent from the following description considered together with the accompanying drawings, in which.

Figures 1, 2, 3:
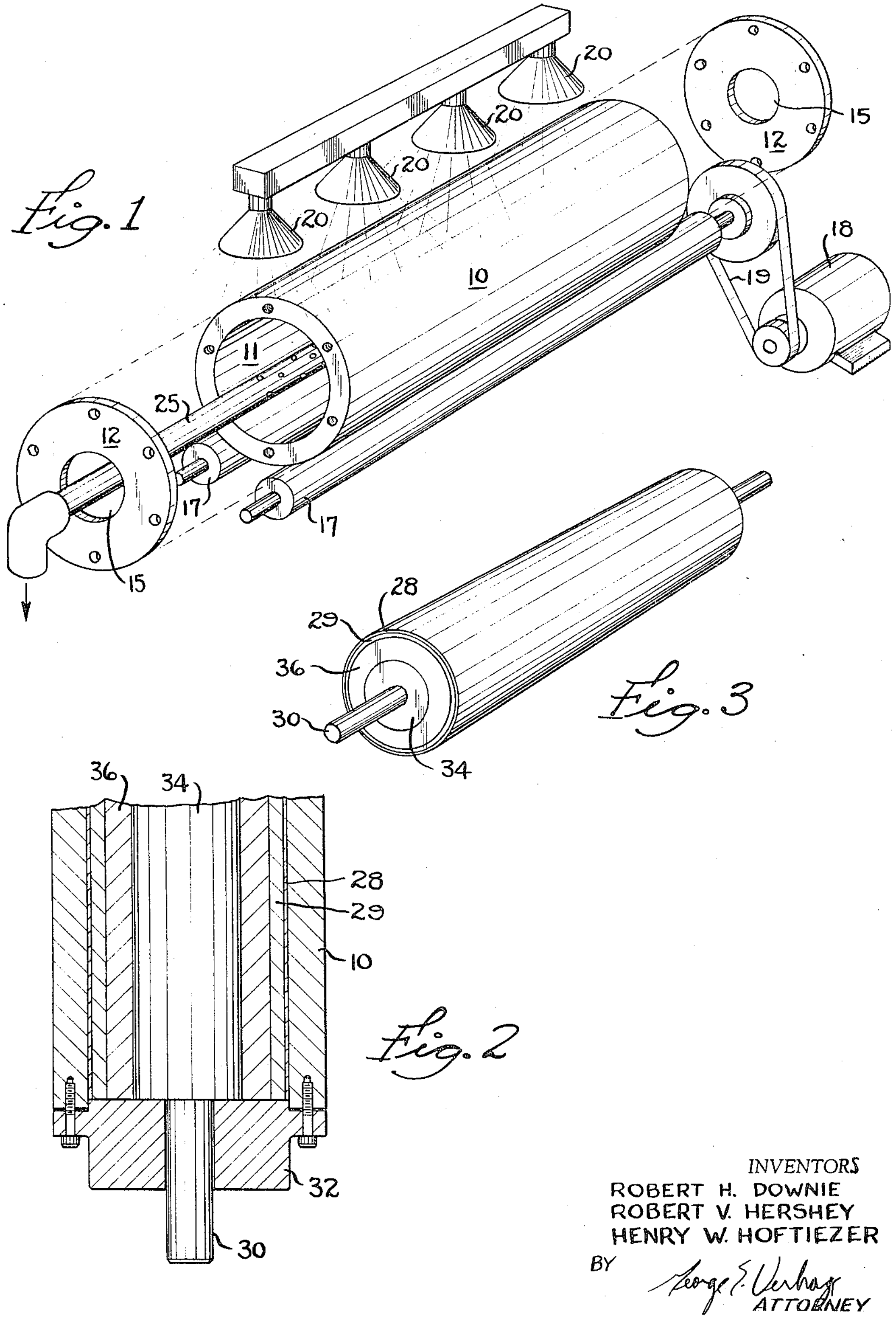
FIGURE 1 is an exploded perspective view of the cylindrical mold and associated elements used in the preparation of the rotogravure cylinders of this invention.
FIGURE 2 is a cross-sectional view of a segment of the mold assembly at one stage in the preparation of the cylinder.
FIGURE 3 is a perspective view of the finished cylinder blank.

In the preparation of the photosensitive polymer-coated rotogravure printing cylinder of this invention, a hollow, one-piece, cylindrical steel casting mold 10 is provided having a uniform interior diameter quite precisely controlled with relation to the desired exterior diameter of the finished printing cylinder. The interior mold surface 11 is microhoned and nickel-plated to present a very smooth, uniform casting surface. The molding cylinder 10 is provided with removable end plates 12 suitably attachable to the cylinder by machine screws, clamps or other conventional means, the end plates being provided with centrally located holes 15 through which the photosensitive coating composition and the back up resin may be introduced and which allow for the withdrawal of solvent vapors. The cylinder is removably mounted on horizontally disposed rollers 17 for rotation about its longitudinal axis. Power for rotation of the rollers is supplied by a motor and variable speed drive assembly designated generally as 18, operating through a belt and pulley assembly 19. The rollers and power elements are suitably mounted on a base frame, not shown in the drawings. External means 20 for supplying controlled heat to the cylinder during its rotation are also provided.

The polymeric material which is to form the surface coating of finished rotogravure cylinder must have certain characteristics to be suitable for this purpose. It must be a solid material capable of being dissolved in a volatile solvent so that a thin, even film of the solid may be formed on the mold interior by evaporation of the solvent from a solution of the solid. It must be capable of forming, by cross-linking or other insolubilizing reaction under the action of light, a polymeric, resinous material which is completely unaffected by the solvents commonly utilized in rotogravure printing processes so that the final cylinder will satisfactorily resist the solvent action of the inks. The final, insolubilized material must also be dimensionally stable and extremely resistant to scuffing and abrasion so that it will retain the fine detail of cell structure required of rotogravure cylinders despite the constant abrading action of the doctor blade which removes excess ink from the cylinder surface during the printing process.

These and other characteristics, the desirability of which will become apparent hereinafter, are preferably achieved through the use of a polymeric compound which, in this particular state, is soluble in a variety of volatile solvents but which, upon the addition of cross-linking agents and light activatable polymerization initiators, may be made photosensitive so that it further polymerizes under the influence of light to a tough, abrasion-resistant polymeric material which is completely insoluble in and unaffected by the solvents commonly present in rotogravure inks. Insolubility, as referred to herein, shall be interpreted as insolubility in the solvents customarily present in rotogravure inks including aliphatic and aromatic hydrocarbons such as hexane, isooctane, benzene, toluene and xylene, esters such as ethyl acetate, isopropyl acetate and butyl acetate, ketones such as methyl ethyl ketone and methyl isobutyl ketone, alcohols such as methyl alcohol, ethyl alcohol and isopropyl alcohol and also solvents of the carbitol or cellosolve types.

The preferred materials for imparting the optimum combination of the above characteristics are alcohol-soluble polyamide type resins which may be cross-linked with a variety of monomers containing two or more points of ethylenic unsaturation to form insoluble polymers when exposed to light in the presence of a light-activatable polymerization initiator.

A dilute alcoholic solution of the polyamide, the unsaturated cross-linking agent and the initiator, in an amount sufficient to coat the interior surface of the mold to a thickness of about 0.003 to 0.006 inch, is placed in the mold and the solvent carefully removed by evaporation at moderately elevated temperature while the cylindrical mold is slowly rotated. Preferably, the alcoholic polyamide solution is added to the mold in a series of increments, a major portion of the solvent being evaporated from the mold between additions of the solution. In order to achieve a smooth coating of even thickness on the interior mold surface, the rate of evaporation of the solvent must be carefully controlled, since too rapid solvent removal may result in blisters forming between the coating and the mold wall or may result in ridging of the coating or unevenness in the coating thickness. The necessary control of the solvent evaporation is obtained by a judicious selection of the temperature of the mold, the speed of rotation of the mold, the concentration of the coating solution and the rate at which air is passed through the interior of the mold to assist in removal of the solvent vapors. Mold temperatures ranging from about 120° to 170° F. are satisfactory for the evaporation of solvent from a solution of the preferred solids concentration range of about 2% to 10%. The mold is rotated about its longitudinal axis at a rate between about 0.1 and about 10 r.p.m. A gentle circulation of air through the mold is achieved by inserting, along the longitudinal axis of the mold, a suction pipe 25 perforated with a number of randomly located small apertures. Air may be passed in either direction through the pipe, but in the preferred procedure, the air enters the mold through the holes in the end plates 12 and is withdrawn, together with solvent vapors, through the suction pipe 25 in such manner that a gentle flow of air is maintained without excessive turbulence within the mold.

After nearly all of the solvent has been removed and the coating film is relatively firm and immobile, the flow of air may be increased and the temperature raised somewhat to assist in removing the last traces of solvent.

It is worthy of particular note that the coating film, designated by the number 28 in FIGURES 2 and 3, is very thin, a thickness of 0.003 and 0.006 inch being adequate for the intended purpose, since the depth of the cells in a rotogravure plate or cylinder customarily ranges from about 0.00004 inch to about 0.0020 inch.

It is economically undesirable to increase the thickness of this layer substantially above that which is adequate for the purpose, and thicker layers have the added disadvantage of requiring more intense or extended exposure to light in order to satisfactorily insolubilize the lower levels of the layer.

As previously mentioned, the photosensitive polymeric coating is underlain or backed up by a casting of a thermosetting resin, preferably of the epoxy type. It has been found that, in order to prepare a printing cylinder which is perfectly cylindrical within the required limits of accuracy, the resin backing material should be cast in a plurality of stages, including a primary back-up layer and a filler layer. The primary backing layer 29, which directly underlies the polymer coating in immediate contact therewith, is preferably quite thin, ranging from about 1/32 inch up to about 1/8 inch in thickness and is of such composition that it sets quite rapidly from a thin fluid to a hard resin. In the molding of this layer, the resin composition is heated and placed in the mold 10 which is then rotated slowly in the horizontal position until the resin forms an even film on the interior surface. The speed of rotation is then increased to force the liquid resin tightly against the photosensitive polymeric coating with substantial pressure due to centrifugal force and the rotation is continued at relatively high speed until the back-up resin layer 29 has completely set.

The primary back-up resin layer 29 is preferably thin to allow for rapid and even dissipation of the heat which is generated by the setting reaction, in order to prevent warping or shrinkage of the resin layer. The formation of a supporting layer of cast resin in intimate continuous contact with the polymer coating is of great assistance in the preparation of a cylinder of uniform diameter and both the composition of the resin and the procedure for its deposition are important factors in the best formation of this layer.

To be satisfactory for this application, the casting resin should have a negligible shrinkage upon setting and should adhere firmly to the polyamide in contact with which it is cast. The epoxy type resins, which are condensation polymers of epichlorohydrin and substituted bis-phenols, have a desirable combination of these required characteristics, and particularly good results have been obtained with an epoxy resin composition containing as a reinforcing filler between 10% and 50% of a finely divided powdered metal, such as aluminum. The metallic component of this composition serves to increase substantially the strength of bond formed between the epoxy resin layer 29 and the polymeric coating layer 28 and also assists in the dissipation of the heat emitted by the resin during the setting process, thereby minimizing the possibility of shrinkage or distortions in the epoxy layer caused by hot spots. If desired, one or more secondary back-up layers may be subsequently cast in similar fashion to reinforce the primary back-up resin, but this is generally considered unnecessary.

After the primary back-up layer 29 has hardened, the end plates 12 are removed from the molding cylinder 10 and a bearing shaft 30 is centered precisely along the longitudinal axis of the cylindrical mold. This may be accomplished conveniently by replacing one of the end plates with a bearing plate 32 as shown in FIGURE 2 having a centrally located bearing aperture which closely fits the shaft 30 to be inserted in the cylinder. The bearing plate 32 is otherwise imperforate so that, with the shaft 30 in place, the end of the mold is effectively closed off and leak proof. If desired, a shaft centering device may also be applied to the opposite end of the cylindrical mold 10, but in this case, an aperture of substantial size is required in one of the two bearing plates for introduction of the filler layer composition into the mold. The shaft 30 may be of solid construction, although preferably the shaft will have a hollow steel drum 34 affixed thereto in the central section which lies within the cylindrical mold, the ends of the shaft protruding from each end of the drum section along its longitudinal axis. The latter construction has the dual advantage of reducing the weight of the finished cylinder and reducing the thickness of the filler layer so that the possibility of imperfect results due to shrinkage is reduced to a minimum. It has been found that a hollow drum section having a diameter between about ½ inch and 1½ inches less than that of the finished cylinder is particularly satisfactory, although the dimensions are not critical, the major function of the drum 34 being to provide light weight bulk to the core section of the cylinder, thus reducing the amount of resin necessary for the filler layer. The term, shaft, as used herein is understood to refer either to a solid shaft or a composite shaft as described above.

After the shaft is centered in the mold, the void between the shaft and the primary back-up layer of resin is filled with a casting resin composition 36, the entire assembly vibrated briefly to eliminate air pockets and the filler layer of resin 36 allowed to set to a solid state. To be satisfactory for use as a filler in the present application, the resin must exhibit negligible shrinkage on setting and must bond firmly to both the primary back-up layer and the shaft material. Fiber glass reinforced epoxy-type resin compositions have given particularly satisfactory results although other tough, resilient resins exhibiting low shrinkage on setting may also be used to form the filler layer 36.

The completed blank cylinder having a surface layer 28 of photosensitive polymer is removed from the mold by chilling the mold assembly sufficiently to allow the completed cylinder to shrink away from contact with the mold wall and to slip smoothly from the mold. The cylinder blank is immediately placed in a warm oven to prevent condensation of moisture on its surface and is allowed to reach room temperature. The preparation of the blank cylinder is then complete and the cylinder may be stored in this condition for substantial periods of time until required for use in a rotogravure printing operation.

To prepare the cylinder for use on a press, the photosensitive surface 28 is exposed to actinic light through an image-bearing process transparency positive of the desired design resulting in a cross-linking polymerization to an insoluble resin in the exposed areas, followed by a washing procedure in a suitable solvent which removes the photosensitive material from the unexposed areas. The resulting finished rotogravure cylinder, having a printing surface formed of a polymeric resin and containing patterned ink-retaining intaglio cells ranging in depth from about 0.0001 inch to about 0.0015 inch, is comparable in its printing characteristics to the conventional rotogravure cylinder formed by etching a pattern of ink-retaining depressions in the surface of a metallic cylinder. The polymer coated printing cylinder is, however, substantially less expensive and time-consuming in its preparation. The utilization of this invention therefore permits the extension of the rotogravure printing process to include situations which were hitherto economically unattractive or impossible due to the expense and time limitations in cylinder preparation.

The following is a specific example of the preparation of a polymer-surfaced rotogravure printing cylinder by the procedure hereinbefore described in general terms.

*Example*

A thin film of photosensitive polyamide was cast on the microhoned inside surface of the previously described seamless casting mold 10 in the following manner. To a 5% ethanolic solution of an alcohol-soluble polyamide such as that sold by the E. I. du Pont de Nemours & Co. under the trade designation Zytel 61 or 63 was added 4.5% of benzophenone and 5.8% of N-N methylene bis-acrylamide, based on the weight of polyamide. A quantity of this solution was placed in the horizontally mounted cylinder, the cylinder rotated at a speed of about 1 r.p.m. and the temperature of the slowly rotating cylinder was raised to about 140° F. to 150° F. to evaporate the solvent, thereby depositing a film of photosensitive polyamide on the interior surface of the cylinder. The amount of the polyamide solution used depends, of course, on the size of the casting cylinder, a sufficient amount being introduced to deposit a film of polyamide between about 0.003 to 0.006 inch thick over the entire interior of the casting mold. To assist in the evaporation of the solvent, provision was made to circulate air through the cylinder by means of the suction pipe 25 to remove solvent vapors as they formed. The cylinder was slowly rotated until the solvent was completely evaporated, about 40 to 60 minutes being sufficient for this phase of the operation. During the last few minutes of this period, the temperature was raised to about 170° F. to ensure complete elimination of traces of solvent. At this point, the casting mold bore on its interior surface a thin, even layer of photosensitive polyamide of a thickness between about 0.003 and 0.006 inch.

For the formulation of a primary backing layer of modified epoxy resin, the following composition was prepared:

39.8% condensible epoxy resin base, such as Epon 828 resin sold by Shell Chemical Company.
10.3% liquid amine curing agent, such as Epoxy Curing Agent Z sold by Shell Chemical Company.
11.8% epoxinated cashew nut oil such as that sold by Minnesota Mining and Manufacturing Company under the trade designation NC–513.
35.8% finely divided aluminum powder such as that sold by Aluminum Company of America under the trade designation Alcoa Atomized Aluminum 101.
2.3% carbon black.

The above condensible composition was heated to 150° F. and introduced into the slowly rotating casting mold bearing a thin interior coating of photosensitive polyamide. As soon as the entire polyamide surface was evenly coated with the epoxy resin composition, the speed of rotation of the mold was increased to substantially in excess of 100 r.p.m. The condensation of the epoxy resin resulted in an increase in temperature of the mold, the temperature rising during setting of the resin to about 200° to 220° F. After the resin had completely set (60–90 minutes), the mold was cooled to about 150° F., dismounted and the ends removed. The casting mold was then upended and a shaft 30 was centered by means of a shaft-centering bearing plate 32 along the longitudinal axis of the cylinder, the shaft extending substantially beyond both ends of the mold. The space within the mold between the shaft and the hardened epoxy resin layer was filled with the following composition heated to about 150° F.

51.6% epoxy resin (Epon 828)
15.5% epoxinated cashew nut oil (NC–513)
12.9% curing Agent Z
20.0% 1/32 inch strand fiberglass.

The filled mold was vibrated to remove bubbles and the mold assembly placed in an oven at 110° F. for 16 hours to cure the filler layer of epoxy resin 36.

To remove the composite cylinder from the mold, the mold assembly was placed in a refrigerated box at 10° F. for 5 hours. It was then found that the cylinder could slip readily from the mold with only gentle tapping, due to the fact that the thermal coefficient of expansion of the composite cylinder varies substantially from that of the metal mold.

Immediately upon removal of the cylinder from the mold, it was placed in a warm oven in a current of dry air to prevent the condensation of moisture on the surface while the cylinder was being brought up to room temperature. Upon reaching room temperature, the blank cylinder was ready for processing preparatory to use in actual rotogravure printing operations.

To prepare the cylinder for printing operations, a screen positive bearing the desired image to be reproduced was held in intimate overall contact with the cylinder surface and the cylinder was exposed to actinic light in a conventional manner, proper exposure requiring only slightly longer exposure than that required for conventional photosensitive resist coatings.

The image structure was developed by spraying the cylinder at room temperature with anhydrous methyl or ethyl alcohol containing from 5 to 140 grams of calcium chloride per liter. The spray rapidly dissolved and removed the polyamide from all areas not exposed to light, forming intaglio ink-retaining and transfer cells of a depth between one and 50 microns (roughly 0.00004 to 0.002 inch) the area and the depth of the cells being dependent on the original dot diameter in the screen positive and the degree of diffuseness or non-parallelism of the light source, respectively. The cylinder was rinsed with clear alcohol and dried in an oven at about 150° F. for about 10 minutes. The cylinder was then ready for utilization on a rotogravure printing press.

Cylinders prepared in the manner herein described have been found completely satisfactory in direct substitution for conventional metallic rotogravure cylinders. The cross-linked polymeric material forming the printing surface of these cylinders is completely unaffected by the solvents commonly employed in rotogravure inks and is highly resistant to the abrasive action of the doctor blade which removes all ink from the non-printing areas of the cylinder surface. The tonal quality of pictorial matter reproduced by use of these polymer-surfaced cylinders is exceptionally good, because the depth of the ink-retaining cells varies directly with their diameter. This very desirable property is very difficult, if not impossible, to attain in conventional etched metal rotogravure cylinders.

Although the procedure for the preparation of the composite, multi-layer rotogravure cylinder of this invention has been described in terms of specific photosensitized polyamides utilized as the outer printing-surface layer and specific epoxy resin compositions utilized in the casting of the back-up and filler layers of the final cylinder, the same basic procedure is applicable to the preparation of cylinders in which the composition of one or more of the layers of the composite structure may differ substantially from those specifically recited herein. It is only necessary that the individual layers display the characteristics herein described as requisite to the satisfactory functioning of the final composite in substitution for a conventional etched metal rotogravure cylinder. A variety of thermosetting casting resins may be utilized in the back-up layer and filler layer, typical examples being resins of the polyurethane, diallyl phthalate, melamine formaldehyde, phenol formaldehyde and polyester types. The epoxy type resins are preferred due to their excellent combination of desirable properties, as hereinbefore mentioned. The epoxy resins are formed by reaction between epichlorohydrin and a substituted bisphenol such as 2,2 bis (4-hydroxyphenyl) pentane, a bis o-cresol, a dihydroxyldiarylsulfone or similar polyhydroxy aryl compound. The polymers are cross-linked by polyfunctional amines, alcohols or anhydrides to form the final cast resin. The thin, outer layer which forms the printing surface of the cylinder may be constituted of any suitable composition which may be cast to a solid layer from a solution in a volatile solvent and which is capable of polymerization or other insolubilizing reaction under the influence of actinic light to yield a rigid, tough, continuous film-like structure which is unaffected by the components of conventional rotogravure inks. A photosensitive polycarbonate such as that obtained as the condensation product of 2,2 (4-4′-dihydroxy-diphenyl) propane and 4,4′-dihydroxy-3-methoxychalcone, for example, may be utilized for this purpose. A cylinder prepared by the process of this invention and having an outer layer of this composition cast from a cyclohexanone solution is rendered insoluble by exposure to light rich in the ultraviolet wavelengths. Methylene chloride may be used as the developing solvent to remove the soluble material remaining in the areas unexposed to light. Similarly a photosensitive film of animal glue and an alkali metal dichromate may be cast from a water solution and insolubilized by light exposure. Water would serve in this case as the developing medium.

The preferred materials for use as the outer, photosensitive layer of the cylinder of this invention are compositions containing a solid, soluble, synthetic linear polyamide together with at least one compatible addition-polymerizable monomer containing at least two double bonds and an addition polymerization initiator activatable by actinic light as hereinbefore described. Materials such as N-methoxymethyl polyhexamethylene adipamide, N-allyloxymethyl polyhexamethylene adipamide, N-isobutoxymethyl polyhexamethylene sebacamide, N-methoxymethyl polyhexamethylene sebacamide and N-benzyloxymethyl polyhexamethylene adipamide-sebacamide may be considered exemplary of satisfactory soluble linear polyamides. A composition of the polyamide with an addition polymerizable monomer such as bis (2-methacrylamidoethyl) amide, glycerol dimethacrylate, magnesium diacrylate or the like, together with a photoactivatable addition polymerization initiator such as benzoin, pivaloin, benzoin methyl ether, diacetyl, benzophenone, or the like, yields a photopolymerizable film of the desired properties.

Although several specific embodiments of the invention have been hereinbefore set forth, these are not intended to be considered as exhaustive, since the showing herein is for the purpose of illustrating rather than limiting the invention, it being understood that the invention may be adapted to particular requirements and that various modifications may be made without departing from the scope and spirit of the invention.

We claim:

1. A method for preparing a multi-layer rotogravure cylinder blank which comprises casting on the smooth, cylindrical inner surface of a seamless casting mold a thin, even layer of a solid photosensitive polymeric composition, casting under centrifugal pressure at least one back-up layer of a casting resin in intimate, over-all adhering contact with said photosensitive composition layer, centering within the cylindrical interior of said mold a shaft of lesser diameter than the interior of the doubly coated mold, filling the space between said shaft and said back-up resin layer with a filler layer of a casting resin, setting said filler layer, chilling the mold assembly, and removing from the mold the composite, multi-layer rotogravure cylinder blank having a thin layer of photosensitive polymeric composition as the surface layer thereof.

2. A method according to claim 1 wherein said photosensitive polymeric composition comprises an alcohol-soluble linear polyamide, a compatible addition polymerizable monomer containing at least two double bonds per molecule and a photoactivatable addition polymerization initiator.

3. A method according to claim 2 wherein said back-up layer of casting resin is comprised of an epoxy type resin reinforced with a finely divided powdered metal and said filler layer of casting resin is comprised of an epoxy type resin reinforced with glass fibers.

(References on following page)

References Cited by the Examiner

UNITED STATES PATENTS

| | | | |
|---|---|---|---|
| 689,230 | 12/1901 | Rolffs | 117—34 |
| 1,318,520 | 10/1919 | Wolever | 264—261 |
| 1,832,066 | 11/1931 | Van Webern. | |
| 2,060,828 | 11/1936 | Schultz. | |
| 2,107,294 | 2/1938 | Griswold | 101—401 |
| 2,791,504 | 5/1957 | Plambeck. | |
| 3,102,030 | 8/1963 | Hoerner | 117—34 X |
| 3,145,654 | 8/1964 | Johnson et al. | 101—401.1 |

DAVID KLEIN, *Primary Examiner.*